United States Patent
Chu

(10) Patent No.: US 7,822,791 B2
(45) Date of Patent: Oct. 26, 2010

(54) METHOD AND APPARATUS FOR FLASH MEMORY RECLAIM

(75) Inventor: Crane Chu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 630 days.

(21) Appl. No.: 11/770,640

(22) Filed: Jun. 28, 2007

(65) Prior Publication Data

US 2009/0006918 A1    Jan. 1, 2009

(51) Int. Cl.
*G06F 12/00* (2006.01)

(52) U.S. Cl. .................. 707/824; 707/813; 711/170; 711/103

(58) Field of Classification Search ............ 707/824, 707/813; 711/170, 103
See application file for complete search history.

(56) References Cited

U.S. PATENT DOCUMENTS

| | | | |
|---|---|---|---|
| 5,671,388 A * | 9/1997 | Hasbun | 711/103 |
| 7,062,616 B2 * | 6/2006 | Sadhasivan et al. | 711/153 |
| 2007/0030734 A1 * | 2/2007 | Sinclair et al. | 365/185.11 |
| 2007/0150691 A1 * | 6/2007 | Illendula et al. | 711/170 |
| 2007/0153585 A1 * | 7/2007 | Blum | 365/185.24 |
| 2007/0233752 A1 * | 10/2007 | Bangalore et al. | 707/202 |
| 2007/0239928 A1 * | 10/2007 | Gera et al. | 711/103 |

* cited by examiner

*Primary Examiner*—Hong Kim
(74) *Attorney, Agent, or Firm*—Blakely, Sokoloff, Taylor & Zafman LLP

(57) ABSTRACT

Machine-readable media, methods, apparatus and system for flash memory reclaim are described. In some embodiment, a system may comprise a flash memory having a plurality of flash memory blocks, and a managing logic to manage a file operation on the flash memory. The managing logic may, during a foreground reclaim of the flash memory which is triggered by the file operation, select a foreground reclaim block from the plurality of flash memory blocks; search the foreground reclaim block for valid data; and copy the valid data from the foreground reclaim block to a flash memory block of the plurality of flash memory blocks, if the valid data is found. The managing logic may further erase the foreground reclaim block during a next reclaim of the flash memory.

14 Claims, 3 Drawing Sheets

METHOD AND APPARATUS FOR FLASH MEMORY RECLAIM

BACKGROUND

Memory may be categorized into read-only memory (e.g., flash memory) and random-access memory. Flash memory reclaim may be used to collect invalid data (or unused data) from a flash memory and return the flash memory to a suitable condition for use. Flash memory reclaim may be categorized into foreground reclaim and background reclaim.

Foreground reclaim may be triggered by a file operation related to the flash memory. Time consumed for the foreground reclaim is aware by an application (e.g., user application or an operating system) that may initiate the file operation. Background reclaim may not be triggered by the file operation. Time consumed for the background reclaim is unaware by the application that may initiate the file operation. In some instances, the background reclaim may occur automatically and regularly (or periodically).

FIG. 1 illustrates an embodiment of a conventional foreground reclaim method. In block 101, a file operation related to a flash memory is determined. Examples of the file operation may comprise writing a file to the flash memory, updating the file stored on the flash memory, and deleting the file from the flash memory. In block 102, it may be determined whether a foreground reclaim is needed for the file operation. Some circumstances related to the file operation may trigger the foreground reclaim, e.g., not enough space for the file operation.

In response that the foreground reclaim is needed, a flash memory block may be selected from a plurality of flash memory block as a reclaim memory block in block 103; the reclaim memory block may be searched for valid data in block 104, and the valid data may be copied from the reclaim memory block to a spare memory block if it is found from the reclaim memory block in block 105. For some instances, the spare memory block may be a flash memory block reserved for a flash memory reclaim.

Then, in block 106, the reclaim memory block may be erased so that it may become a new spare memory block reserved for a next memory reclaim. In block 107, the file operation may be performed on the flash memory, for example, on the spare memory block.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for method and apparatus of flash memory reclaim. In the following description, numerous specific details such as logic implementations, pseudo-code, methods to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
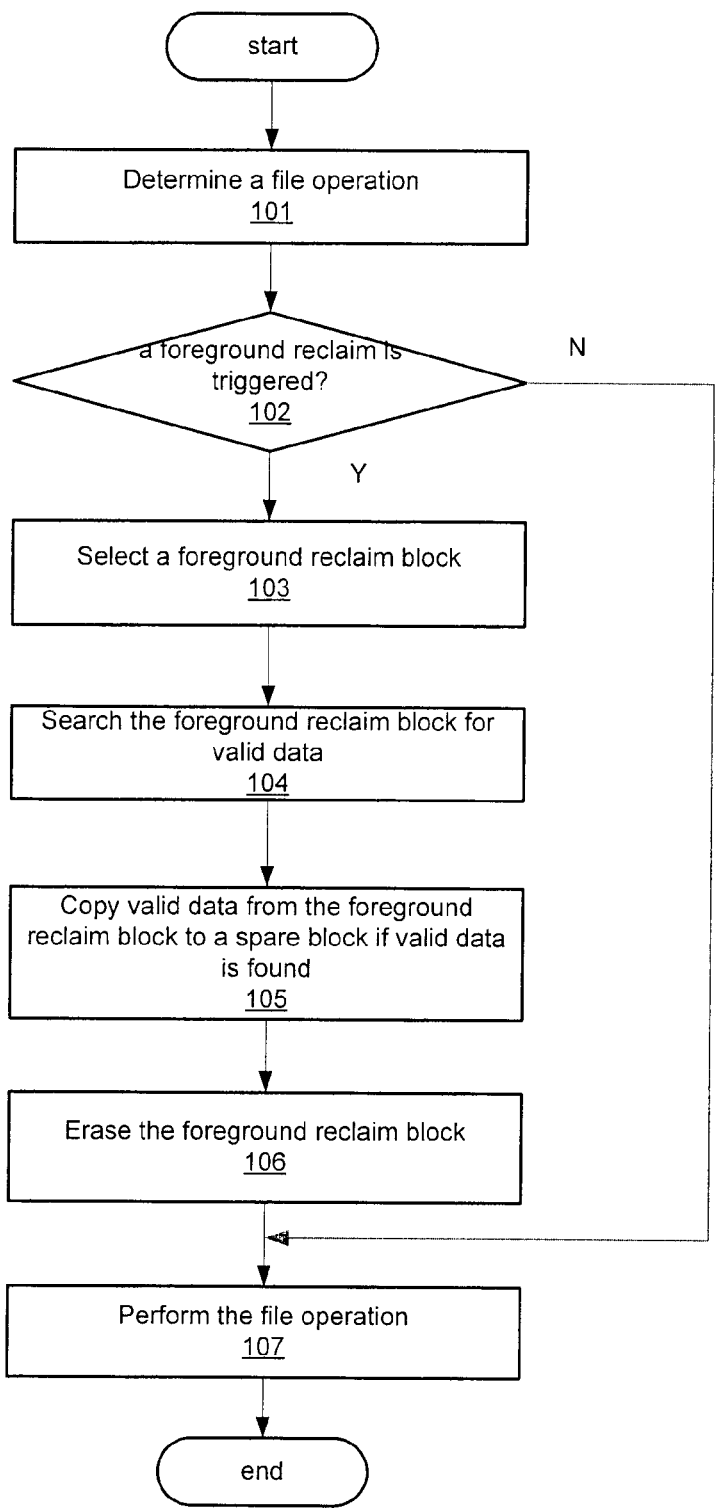
FIG. 1 illustrates an embodiment of a conventional foreground reclaim method.
Figure 2:
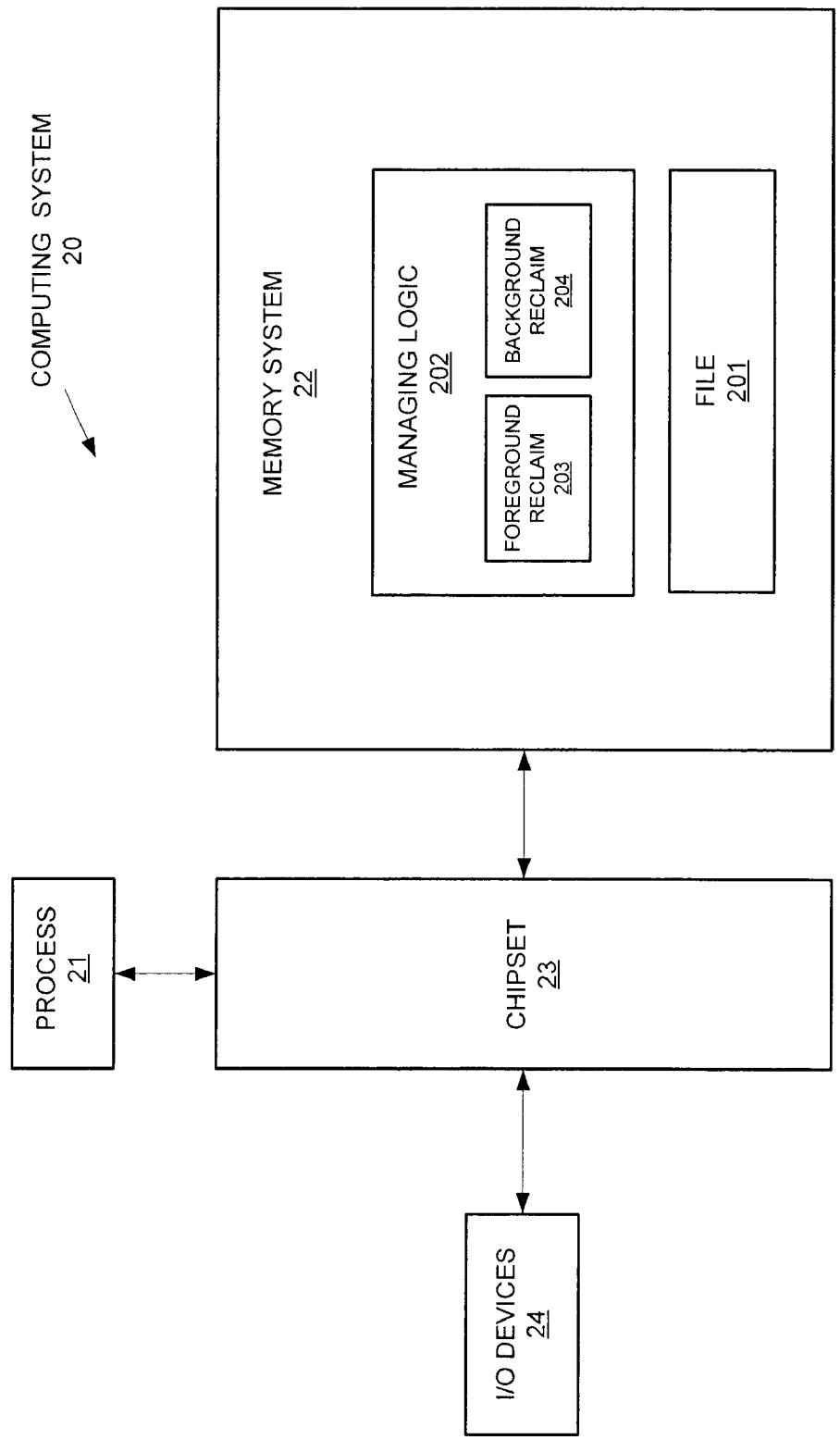
FIG. 2 illustrates an embodiment of a computing system.

FIG. 2 shows an embodiment of a computing system 20. As shown, computing system 20 may comprise one or more processor 21, memory system 22, chipset 23, I/O devices 24, and possibly other components. Examples for the computing system 20 may comprise a cell phone, a digital camera, a computer and other devices for processing and storing data.

One or more processors 21 may be communicatively coupled to various components (e.g., the chipset 23) via one or more buses such as a processor bus. Processors 21 may be implemented as an integrated circuit (IC) with one or more processing cores that may execute codes under a suitable architecture, for example, including Intel® Pentium™, Intel® Itanium™, Intel® Core™ Duo architectures, available from Intel Corporation of Santa Clara, Calif.

Memory system 22 may comprise one or more memory devices (not shown) that may be or may not be of the same type. For example, some of the memory devices may be read-only memory devices (ROM), while some others may be random-access memory devices (RAM). Examples of the read-only memory devices may comprise a flash memory.

Memory system 22 may store instructions and data as a file 201 and a managing logic 202. Managing logic 202 may manage a file operation related to a memory device, e.g., the flash memory. The file operation may be initiated by an application such as user application or an operating system. Examples for the file operation may comprise writing file 201 to the flash memory, updating file 201 stored on the flash memory, deleting file 201 from the flash memory.

Managing logic 202 may comprise a foreground reclaim logic 203 and a background reclaim logic 204. Foreground reclaim logic 203 may reclaim the flash memory upon being trigged by the file operation. In other words, the foreground reclaim may occur under certain circumstances that are related to the file operation, such as, not enough memory space for the file operation. Time consumed during the foreground reclaim may be aware by the application that may initiate the file operation. Background reclaim logic 204 may reclaim the flash memory automatically and regularly (or periodically). In other words, the background reclaim may not be triggered by any file operations. Time consumed during the background reclaim may be unaware by any applications that may initiate the file operations. In lieu of this, the foreground reclaim may be more time-sensitive than the background reclaim.

Upon being triggered by the file operation, foreground reclaim logic 203 may select a flash memory block from a plurality of flash memory blocks as a foreground reclaim block. For example, foreground reclaim logic 203 may select the flash memory block which has a large amount of invalid data. Then, foreground reclaim logic 203 may search the foreground reclaim block for valid data and copy the valid data from the foreground reclaim block to a memory block if the valid data is found. The memory block may be a spare flash memory block reserved by the system 20 for purposes such as flash memory reclaim.

The foreground reclaim block may not be erased during this foreground reclaim, but instead, be erased during a next memory reclaim, no matter whether the next memory reclaim is a background reclaim or another foreground reclaim. In other words, erasing of the reclaim memory block may be delayed until the next memory reclaim occurs. With such scenario, the application that may initiate the file operation may feel that time experienced for this file operation is shortened.

If the next memory reclaim is a background reclaim, background reclaim logic 204 may erase the foreground reclaim block during the background reclaim. In such case, the background reclaim may comprise erasing the foreground reclaim block, selecting a flash memory block as a background reclaim block, coping valid data from the background reclaim block to a memory block reserved for the flash memory reclaim (e.g., the erased foreground reclaim block may act as the memory block now), if valid data is found from the background reclaim block, and finally erasing the background reclaim block. With this scenario, the application that may initiate the file operation may be unaware of the time consumed for erasing the foreground reclaim block.

However, if the next memory reclaim is another foreground reclaim (e.g., a next foreground reclaim triggered by a next file operation), foreground reclaim logic 203 may erase the foreground reclaim block during the next foreground reclaim. In such case, the next foreground reclaim may comprise erasing the foreground reclaim block, selecting a flash memory block as a next foreground reclaim block, and copying valid data from the next foreground reclaim block to a memory block reserved for the flash memory reclaim (e.g., the erased foreground reclaim block may act as the memory block now), if valid data is found from the next foreground reclaim block.

The next foreground reclaim may not erase the next foreground reclaim block, but instead, delay the erasing until a yet next memory reclaim occurs (either a background reclaim or a foreground reclaim). Therefore, time consumed for the next foreground reclaim is almost the same as that for a conventional foreground reclaim.

Chipset 23 may provide one or more communicative paths among one or more processors 21, memory 22 and other components, such as I/O devices 24. I/O devices 24 may input or output data to or from computing system 20. Examples for I/O devices 24 may comprise a network card, a blue-tooth, an antenna, and possibly other devices for transceiving data.

Figure 3:
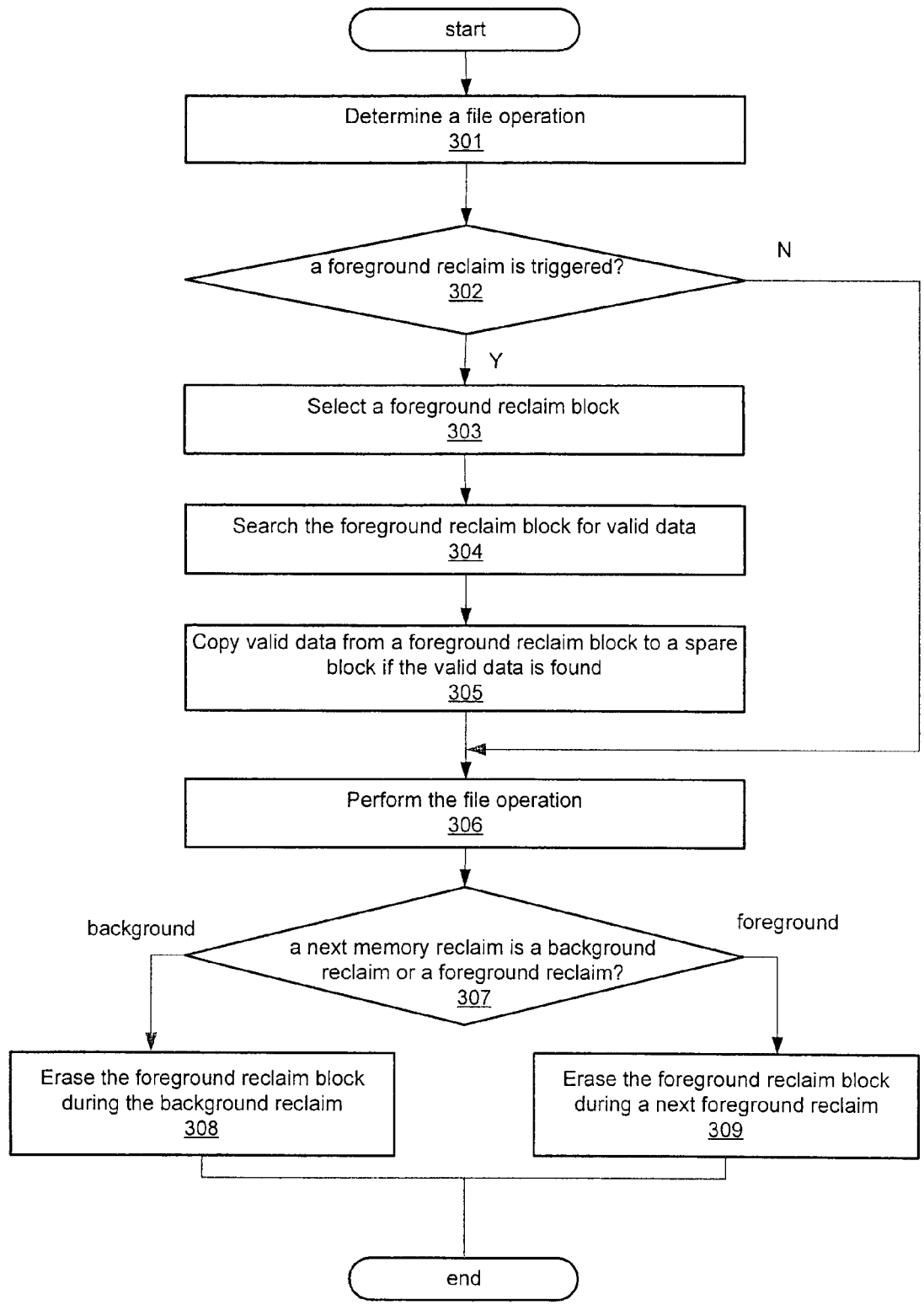
FIG. 3 illustrates an embodiment of a foreground reclaim method according to the present invention.

FIG. 3 illustrates an embodiment of a foreground reclaim method according to the present invention. In block 301, a file operation related to a flash memory may be determined. Examples of the file operation may comprise writing a file to the flash memory, updating the file stored on the flash memory and deleting the file from the flash memory. In block 302, managing logic 202 may determine whether a foreground reclaim of the flash memory is triggered by the file operation. Some circumstances related to the file operation may induce the foreground reclaim, for example, not enough memory space for the file operation.

Then, managing logic 202 may select a flash memory block as a foreground reclaim block in block 303, search the foreground reclaim block for valid data in block 304 and copy the valid data from the foreground reclaim block to a memory block reserved for the flash memory reclaim (e.g., a spare flash memory block) if the valid data is found in block 305. In block 306, managing logic 202 may perform the file operation related to the flash memory. In block 307, managing logic 202 may determine whether a next memory reclaim is a background reclaim or another foreground reclaim (i.e., a next foreground reclaim).

In response to the background reclaim, background reclaim logic 204 of managing logic 202 may erase the foreground reclaim block during the background reclaim. As stated above, the background reclaim may comprise erasing the foreground reclaim block, selecting a flash memory block as a background reclaim block, coping valid data from the background reclaim block to a memory block reserved for the flash memory reclaim (e.g., the erased foreground reclaim block may act as the memory block now), if valid data is found from the background reclaim block, and erasing the background reclaim block.

In response to the next foreground reclaim, foreground reclaim logic 203 of managing logic 202 may erase the foreground reclaim block during the next foreground reclaim. As stated above, the next foreground reclaim may comprise erasing the foreground reclaim block, selecting a flash memory block as a next foreground reclaim block, and copying valid data from the next foreground reclaim block to a memory block reserved for the flash memory reclaim (e.g., the erased foreground reclaim block may act as the memory block now), if valid data is found from the next foreground reclaim.

Other embodiments may implement other technologies to the method of FIG. 3. For example, there is no requirement to an ordering relationship between performing the file operation and erasing the foreground reclaim block. For example, the file operation may be performed before or simultaneously with the erasing of the foreground reclaim block.

Although the present invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A system, comprising:
   a flash memory comprising a plurality of flash memory blocks; and
   a managing logic to manage a file operation related to the flash memory, wherein during a foreground reclaim of the flash memory which is triggered by the file operation, the managing logic is further to:

select a foreground reclaim block from the plurality of flash memory blocks;
search the foreground reclaim block for valid data; and
copy the valid data from the foreground reclaim block to a flash memory block of the plurality of flash memory blocks, if the valid data is found, and wherein during a next reclaim of the flash memory, the managing logic is further to erase the foreground reclaim block;
wherein, the managing logic is further to determine whether the next reclaim of the flash memory is a background reclaim or a next foreground reclaim, wherein the background reclaim is not triggered by any file operations; and if the next reclaim is the background reclaim, then during the background reclaim and after the erasing of the foreground reclaim block, the managing logic is further to:
select a background reclaim block from the plurality of flash memory blocks,
search the background reclaim block for valid data,
copy the valid data from the background reclaim block to the foreground reclaim block if the valid data is found, and
erase the background reclaim block.

2. The system of claim 1, wherein the managing logic is further to manage the file operation performed after the foreground reclaim and before the erasing of the foreground reclaim block.

3. The system of claim 1, wherein the managing logic is further to manage the file operation performed after the foreground reclaim and at the same time as the erasing of the foreground reclaim block.

4. The system of claim 1, wherein if the next reclaim is the next foreground reclaim, then during the next foreground reclaim and after the erasing of the foreground reclaim block, the managing logic is further to:
select a next foreground reclaim block from the plurality of flash memory blocks,
search the next foreground reclaim block for valid data; and
copy the valid data from the next foreground reclaim block to the foreground reclaim block if the valid data is found, and wherein the next foreground reclaim block is erased during a yet next reclaim of the flash memory.

5. The system of claim 1, wherein the file operation includes an operation selected from a group comprising writing a file to the flash memory, deleting the file from the flash memory, and updating the file stored on the flash memory.

6. A method, comprising:
during a foreground reclaim which is triggered by a file operation related to a flash memory,
selecting a foreground reclaim block from a plurality of flash memory blocks of the flash memory;
searching the foreground reclaim block for valid data; and
copying the valid data from the foreground reclaim block to a flash memory block of the plurality of flash memory blocks, if the valid data is found;
erasing the foreground reclaim block during a next reclaim of the flash memory;
determining the next reclaim is a background reclaim or a next foreground reclaim, wherein the background reclaim is not trigger by any file operations and if the next reclaim is the background reclaim, then during the background reclaim and after the erasing of the foreground reclaim block:
selecting a background reclaim block from the plurality of flash memory blocks;
searching the background reclaim block for valid data;
copying the valid data from the background reclaim block to the foreground reclaim block, if the valid data is found; and
erasing the background reclaim block.

7. The method of claim 6, further comprising performing the file operation related to the flash memory after the foreground reclaim and before the erasing of the foreground reclaim block.

8. The method of claim 6, further comprising performing the file operation related to the flash memory after the foreground reclaim and at the same time as the erasing of the foreground reclaim block.

9. The method of claim 6, further comprising: if the next reclaim is the next foreground reclaim, then during the next foreground reclaim and after the erasing of the foreground reclaim block:
selecting a next foreground reclaim block from the plurality of flash memory blocks;
searching the next foreground reclaim block for valid data; and
copying the valid data from the next foreground reclaim block to the foreground reclaim block if the valid data is found,
wherein the next foreground reclaim block is erased during a yet next reclaim of the flash memory.

10. The method of claim 7, wherein the file operation includes an operation selected from a group comprising writing a file to the flash memory, deleting the file from the flash memory and updating the file stored on the flash memory.

11. A machine-readable medium comprising a plurality of instructions which when executed result in a system:
during a foreground reclaim which is triggered by a file operation related to a flash memory,
selecting a foreground reclaim block from a plurality of flash memory blocks of the flash memory;
searching the foreground reclaim block for valid data; and
copying the valid data from the foreground reclaim block to a flash memory block of the plurality of flash memory blocks, if the valid data is found;
erasing the foreground reclaim block during a next reclaim of the flash memory; and
determining the next reclaim is a background reclaim or a next foreground reclaim, wherein the next foreground reclaim is trigger by a next file operation related to the flash memory and if the next reclaim is the next foreground reclaim, then during the next foreground reclaim and after the erasing of the foreground reclaim block;
selecting a next foreground reclaim block from the plurality of flash memory blocks;
searching the next foreground reclaim block for valid data; and
copying the valid data from the next foreground reclaim block to the foreground reclaim block if the valid data is found,
wherein the next foreground reclaim block is erased during a yet next reclaim of the flash memory.

12. The machine-readable medium of claim 11, wherein the plurality of instructions further result in the system, performing the file operation related to the flash memory after the foreground reclaim and before the erasing of the foreground reclaim block.

13. The machine-readable medium of claim 11, wherein the plurality of instructions further result in the system, performing the file operation related to the flash memory after the foreground reclaim and at the same time as the erasing of the foreground reclaim block.

14. The machine-readable medium of claim 11, wherein the plurality of instructions further result in the system, if the next reclaim is the background reclaim, then during the background reclaim and after the erasing of the foreground reclaim block:

selecting a background reclaim block from the plurality of flash memory blocks;
searching the background reclaim block for valid data;
copying the valid data from the background reclaim block to the foreground reclaim block, if the valid data is found; and
erasing the background reclaim block.

* * * * *